(12) United States Patent
Davies et al.

(10) Patent No.: US 7,062,578 B2
(45) Date of Patent: Jun. 13, 2006

(54) FLEXIBLE PROCESSING HARDWARE ARCHITECTURE

(75) Inventors: David C. Davies, Chelmsford, MA (US); Michael P. Greenberg, Goffstown, NH (US); Michael J. Wilt, Windham, NH (US); John E. Agapakis, Sudbury, MA (US)

(73) Assignee: Acuity Imaging, LLC, Nashua, NH (US)

( * ) Notice: Subject to any disclaimer, the term of this patent is extended or adjusted under 35 U.S.C. 154(b) by 723 days.

(21) Appl. No.: 09/977,413

(22) Filed: Oct. 15, 2001

(65) Prior Publication Data

US 2002/0019924 A1   Feb. 14, 2002

Related U.S. Application Data

(60) Division of application No. 09/030,411, filed on Feb. 25, 1998, now Pat. No. 6,308,234, which is a continuation-in-part of application No. 08/953,772, filed on Oct. 17, 1997, now Pat. No. 6,208,772.

(60) Provisional application No. 60/066,339, filed on Nov. 21, 1997.

(51) Int. Cl.
*G06F 13/00* (2006.01)
*H04N 7/14* (2006.01)

(52) U.S. Cl. .................. 710/100; 710/104; 348/14.1

(58) Field of Classification Search ............... 710/100, 710/305, 104; 348/15–20, 14.1–14.12
See application file for complete search history.

(56) References Cited

U.S. PATENT DOCUMENTS

| | | | | | |
|---|---|---|---|---|---|
| 5,764,968 A | * | 6/1998 | Ninomiya | .................. | 713/601 |
| 5,889,480 A | * | 3/1999 | Kim | ........................... | 341/50 |
| 5,969,750 A | * | 10/1999 | Hsieh et al. | .............. | 348/14.1 |
| 5,987,590 A | * | 11/1999 | Wing So | ..................... | 712/35 |

* cited by examiner

*Primary Examiner*—Tim Vo
(74) *Attorney, Agent, or Firm*—Bouroue & Associates, P.A.

(57) ABSTRACT

A flexible, reconfigurable processing system architecture allows for the implementation of a variety of processing system configurations to be implemented on a single device, which is preferably a PCI bus add-in extension board with an attached daughter card attached and electrically connected thereto through a PCI Mezzanine type connector, and which is plugged into a personal computer PCI expansion slot. The architecture uses the PCI bus, for example, as the local CPU bus for an embedded processor, which not only allows for flexibility in system configuration but also allows PCI devices to be hidden from the host CPU to allow for proper system startup. The architecture further permits an embedded processing CPU to be re-booted when the secondary PCI bus host bus bridge fails to respond without affecting host CPU or other secondary PCI bus peripheral devices. The architecture provides a method of loading an embedded system CPU's local memory with operating system and diagnostic code without the use of ROM or FLASH memory. A system and method of reserving memory is also disclosed which utilizes a dummy or surrogate board with little of no functionality but which has a class code of a common device such as an Ethernet card. The primary system BIOS will read the class code and reserve memory based on the surrogate card. The driver of the non-standard card such as an embedded processor, can then use the memory space allocated to the surrogate card by the BIOS.

6 Claims, 8 Drawing Sheets

FLEXIBLE PROCESSING HARDWARE ARCHITECTURE

RELATED APPLICATIONS

This application is a divisional of U.S. patent application Ser. No. 09/030,411, filed Feb. 25, 1998 now U.S. Pat. No. 6,308,234.

This is a Continuation-in-part of U.S. patent application Ser. No. 08/953,772, filed Oct. 17, 1997 now U.S. Pat. No. 6,208,772 which claims the benefit of provisional application No. 60/066,339 filed Nov. 21, 1997.

FIELD OF THE INVENTION

This invention relates to the field of flexible and modifiable processing hardware architecture and more particularly, to a processing hardware architecture that allows for multiple system configurations.

BACKGROUND OF THE INVENTION

The advent of the personal computer (PC) has enabled a variety of low cost processing systems such as image processing & machine vision system designs based on standardized hardware which take advantage of the technological innovation of the PC market.

Four typical configurations of such PC based image processing and/or machine vision systems that are widely used today are highlighted below.

In the simplest configuration of such as system, a frame grabber or camera interface board or system resides on the PC's peripheral bus and is used to acquire images from one or more cameras into the PC's memory where the images can be accessed and processed by the PC CPU. This will be referred to as the frame grabber or host processing configuration since the host CPU is solely responsible for all image processing operations.

Another class of such systems uses a plug-in processor accelerator board to assist the PC CPU in performing some of the computationally expensive and extensive image processing operations. This will be referred to as the vision accelerator or accelerated host processing configuration.

Yet another possible configuration involves a complete image processing or machine vision subsystem in the form of an expansion board plugged in the PC's peripheral bus. This board features and on-board CPU, often also coupled with dedicated image processing acceleration hardware. In this configuration, the embedded or target CPU completely off-loads all vision processing operations from the host PC CPU which can now be dedicated to user interface, control, or other tasks running on it concurrently with the image/vision processing tasks running on the vision processor. This multiprocessing configuration will be referred to as the embedded vision processing engine or target processing configuration.

A final configuration uses the PC only as the programming and/or user interface environment for a standalone vision processing engine connected to it through a high speed serial or network connection. This configuration will be referred as the standalone vision processing engine or standalone target processing configuration.

Most recently, the PCI bus[1] has enabled high bandwidth data transfers between a plug-in device such as an image acquisition or image processing board and the host PC, further enhancing the performance of all the above mentioned embedded system configurations.

[1]PCI Local Bus Specification, Revision 2.1, Jun. 1, 1995

The wide availability of PCI compatible components for the PC market makes it also attractive as a local bus to be used inside a processing subsystem such as the above mentioned image or vision processing subsystem configurations.

Use of the PCI bus as a local bus is not without its drawbacks however. For example, the PCI bus was designed primarily for the PC market and as such, the topology and data flow is directed from a host CPU through a host bus bridge to a tree of peripheral buses connected through PCI to PCI bridges (herein referred to as peripheral bridges). The host CPU expects to be the only CPU in the system and also expects that its main memory is fixed in the system memory map. Any plug-in card, board or device with an embedded CPU has to allow its local memory to be mapped to avoid conflict with the host PC memory. Memory assignments may come from one or two sources: PCI BIOS or the host operating system (OS). Care must be taken when necessary to avoid system lockups by either hiding devices behind the peripheral bus bridges (where they are inaccessible by the host PC system), or by temporarily disconnecting them from the PCI bus until they are ready to accept bus transactions.

A further drawback to using the PCI bus as a local bus inside PCI based systems is caused by a video graphics adapter (VGA), herein referred to as the display controller, and the discovery process used by the PCI BIOS and host Operating System (OS) to determine the system display controller. There are many different PCI BIOS manufacturers using different discovery algorithms some of which become confused by more than one display controller on the PCI bus. Also, PCI adapter card manufacturers who write drivers for their products sometimes introduce problems, e.g. when an expansion card has a peripheral bridge chip.

SUMMARY OF THE INVENTION

This invention accordingly provides the following improvements over the current state of the art:

1. A flexible vision processing architecture that uses the PCI bus as the embedded processor local bus and which enables a variety of embedded and standalone vision system configurations to be implemented with either no or only minor hardware and software modifications.

2. Two different methods for hiding PCI devices that avoid conflicts with the host PC and allow for the embedded CPU boot correctly.

3. Use of a peripheral bus register to reset the embedded CPU when the secondary PCI bus host bus bridge fails to respond, without affecting other secondary bus PCI devices and the host or primary CPU.

4. A method of loading the embedded CPU's local memory with diagnostics and Operating System code without the use of ROM or FLASH memory.

These and other improvements over the prior art are realized by a reconfigurable vision or other processing system architecture, which is the subject matter of the present invention. The reconfigurable processing system architecture allows for the implementation of a variety of vision or other system configurations to be implemented on a single device, which, in one embodiment, is preferably a PCI bus add-in extension board with an attached digitizer daughter card attached and electrically connected thereto through a PCI Mezzanine connector, and which is plugged into a personal computer PCI expansion slot. The flexible and reconfigurable processing hardware architecture of the present invention uses the PCI bus as the embedded vision processor CPU's local bus, which not only allows for flexibility in vision system configuration but also allows PCI devices to be hidden from the host CPU to allow for proper system startup. The architecture further permits an embedded vision processing CPU to be re-booted when the secondary PCI bus host bus bridge fails to respond without affecting host CPU or other secondary PCI bus peripheral devices. Finally, the architecture of the present invention provides a method of loading an embedded vision system CPU's local memory with operating system and diagnostic code without the use of ROM or FLASH memory.

DESCRIPTION OF THE PREFERRED EMBODIMENT

The hardware described in this invention comprises, in the preferred embodiment, a PCI bus add-in extension board 100 that includes a digitizer subsystem D embodied, for exemplary purposes, in a digitizer daughter card attached and electrically connected to extension board 100 through a PCI Mezzanine connector[2] (pmc) 36; although such an implementation is not a limitation of the present invention.

[2]Draft Standard Physical and Environmental Layers for PCI Mezzanine Cards: PMC, IEEE 1386/Draft 2.0, Apr. 4, 1995

Although the present invention will be explained utilizing the PCI bus for exemplary purposes, this is not a limitation of the present invention. For example, the compact PCI bus specification which in one implementation is a 64 bit bus operating at 66 MHz and any other PCI bus specification to be specified in the future are considered to be within the scope of the present invention. In addition, any flexible architecture which utilizes a bus structure which makes two (2) devices look like they are connected together including a bus which allows for bus extensions with or without electrical buffering, and which bus and bus extension are designed to operate as a single bus, is considered to be within the scope of the present invention.

On the board 100 is a PCI to PCI bridge[3] 25, which interfaces a host CPU PCI peripheral bus 27 to a secondary, vision processing system PCI bus 26 included on the PCI extension board.

[3]See PCI to PCI bridge architecture specification Rev. 1.0

The extension board 100 also includes a processing accelerator subsystem A, implemented preferably as an ASIC (application specific integrated circuit) 20, a VGA (video graphics adapter) or similar display controller 33, and a system CPU subsystem C. The components of the system CPU subsystem C include an embedded system CPU 16, which interfaces to the host system PCI bus 27 via a CPU subsystem CPU bus 15, a host bus bridge 17, and the PCI to PCI bridge 25. Host system components which may be included in the subsystem include local DRAM (dynamic random access memory) system memory 22 and system peripherals 21 such as a DUART RS232 serial controller, NVRAM (non-volatile random access memory) with a real-time clock and a CPLD (complex programmable logic device) providing registers, CPU startup information and other board "glue" logic, as is well known in the art. Power is continually monitored by a CPU supervisory chip, which provides advanced warning to the CPU in the event of a power failure and further provides for manual board reset.

In the case wherein the present invention is implemented in a vision system, digitized video data is sent from the digitizer 12 (a true data digitizer 12 in the case of an analog camera 14, or a camera interface 12 if the camera 14 is a digital camera) or other general purpose interface over the secondary, vision system PCI bus 26 to local DRAM 22 on the board or to the host PC's local display controller 35 having its own memory 37. The vision processing accelerator 20 "snoops" these transactions using snoop handshake, 21, thus loading the ASIC memory 18a and 18b with the digitized video information. After processing in the processing accelerator 20, the data is sent to the embedded vision system CPU 16 for further processing. Finally, the data may be displayed on local display 28 from the local display controller 33 or as an overlay in the host PC's display controller.

A plurality of boards can be mapped anywhere into PC memory within the host PC resource constraints and will not cause boot time conflicts with the PC hardware.

Flexible Vision Processing Architecture

The present invention includes the disclosed architecture which allows a wide variety of system variants to be implemented with minimal hardware and software incremental investment.

Figure 1:
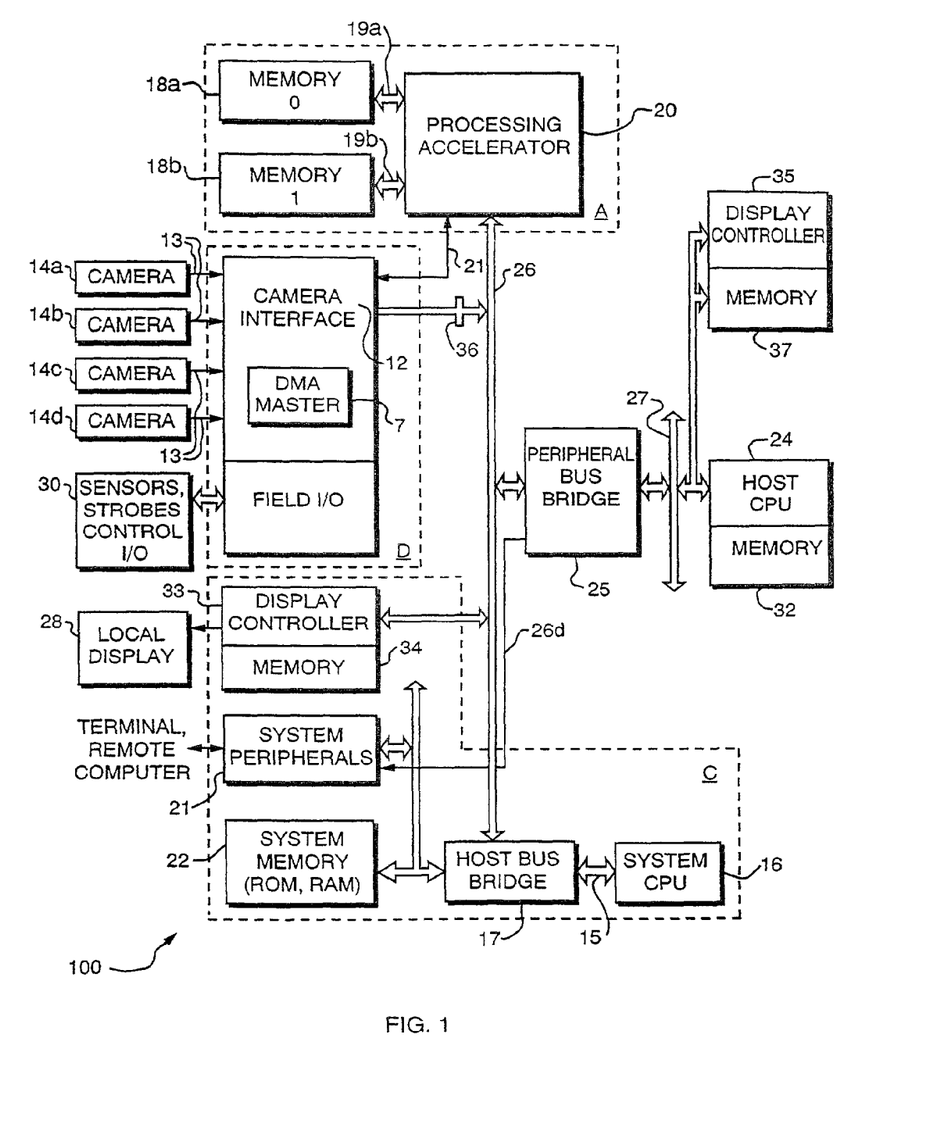
FIG. 1 is a the block diagram of an embedded processing engine configuration.

FIG. 1 shows the basic configuration for a vision processing engine system embedded in a PC as a PCI expansion board. By using the PCI bus as the local bus of the vision processing subsystem as well as the local bus of the host PC, the present invention takes advantage of widely available components and easily implements alternative vision system configurations through different combinations of the major functional groupings of the base architecture as will be explained below.

The main such functional groups shown in FIG. 1 are the digitizer (also referred to as the frame grabber or camera interface) subsystem D, the vision CPU subsystem C, and the vision accelerator subsystem A. All these subsystems are connected to each other through the secondary, vision processing system PCI bus 26 which is itself connected to the PC's (Host CPU) PCI bus 27, host CPU 24 and associated memory 32 through a bus peripheral bus interface, which, in this embodiment is a PCI-to-PCI bus bridge 25[3].

[3]PCI to PCI Bridge Architecture Specification, Rev. 1.0, Apr. 5, 1994

In the embodiment of such a vision system shown in FIG. 1, image data 13 from multiple cameras 14a–14d can be processed by the vision accelerator 20, the embedded vision system CPU 16, or by a host CPU 24 in cases where the vision system resident on the host CPU peripheral data bus (e.g. as an adapter or peripheral card). A vision system often includes a local display 28 and serial and discrete input/ output ports 30 to support real-time machine vision operations and intercommunications with other devices.

For maximum efficiency, the digitizer 12 in this implementation packs multiple pixels (data samples) into a larger word to match the width of the vision processing system PCI bus 26. If the memory data bus 19 width and the vision processing system PCI bus 26 width are not the same, the processing accelerator 20 would reformat peripheral bus words to match the width of the memory data bus 19 or the vision processing system PCI bus 26.

The digitizer 12, in connection with direct memory access (DMA) master controller 7, moves pixel data samples in high speed bursts into a portion of peripheral data bus address space. In the present invention, this may be one of the image memories 18a and/or 18b, shared vision system CPU memory 22, host CPU memory 32, display controller memory 34, or host display controller memory 37.

A more detailed explanation of the operation of the embedded vision system including a processing accelerator A is provided in commonly owned patent application Ser. No. 08/953,772, which is incorporated herein by reference.

To enhance the flexibility of this configuration further, the digitizer subsystem D is implemented as a mezzanine daughter card. Utilizing this implementation, a variety of different camera interface boards can be combined with the same vision processing engine board 100. The connection to such a mezzanine card is through a PCI mezzanine connector (PMC) 36.

Figure 2:
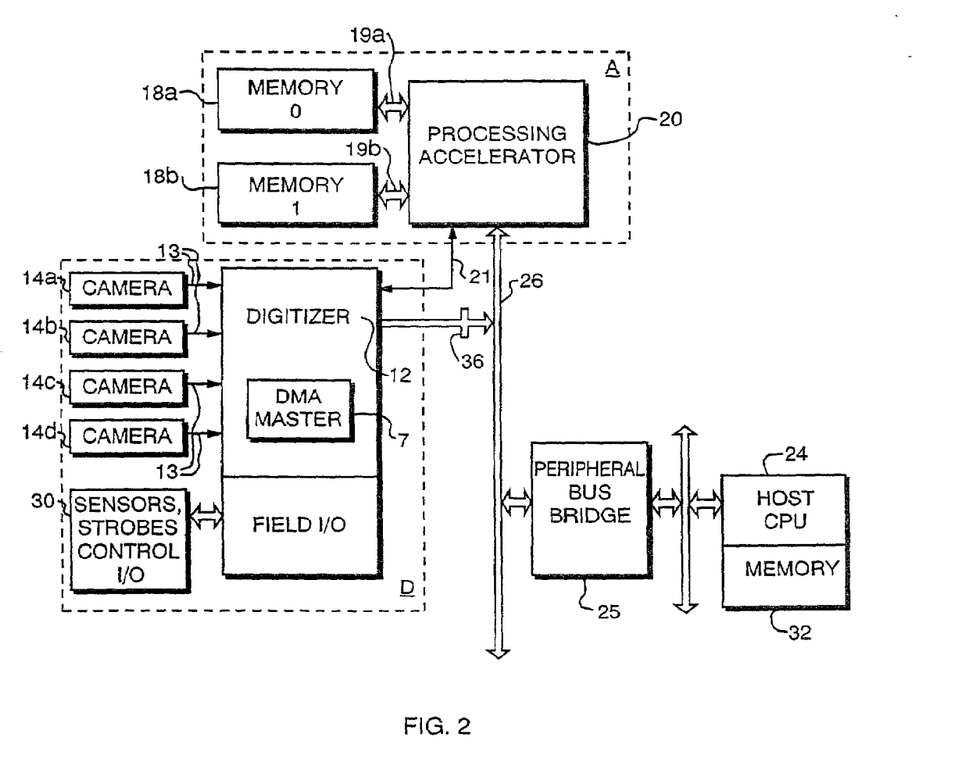
FIG. 2 is a block diagram of a processing accelerator (with digitizer) configuration according to one embodiment of the present invention.

FIG. 2 shows a cost reduced version of the embedded vision engine configuration of FIG. 1 wherein the embedded vision system CPU 16, host bus bridge 17, system memory 22, system peripherals 26b and display controller are removed to create the accelerated host configuration mentioned earlier.

In the embodiment of FIG. 2, the vision processing system comprises a digitizer subsystem D, which includes substantially the same components discussed above with respect to the-digitizer subsystem of FIG. 1. (The common components of the two digitizer subsystems are identified using the same reference numerals.) The second component of the vision processing system of FIG. 2 is the vision accelerator subsystem A, which, like the digitizer subsystem D, is substantially identical to the processing accelerator subsystem A of FIG. 1 and common components are indicated using the same reference numerals. This embodiment can be implemented using a plug-in expansion card in much the same manner as the embodiment of FIG. 1. However, the expansion card would not include the components of the vision CPU subsystem C (of FIG. 1). In this embodiment, the, host CPU 24 is tasked with running the vision subsystem application. However, the vision accelerator subsystem would still be available with its processing accelerator ASIC 20, which would allow digitized video information to be pre-processed before it is routed to the host CPU 24 for further processing.

Figure 3:
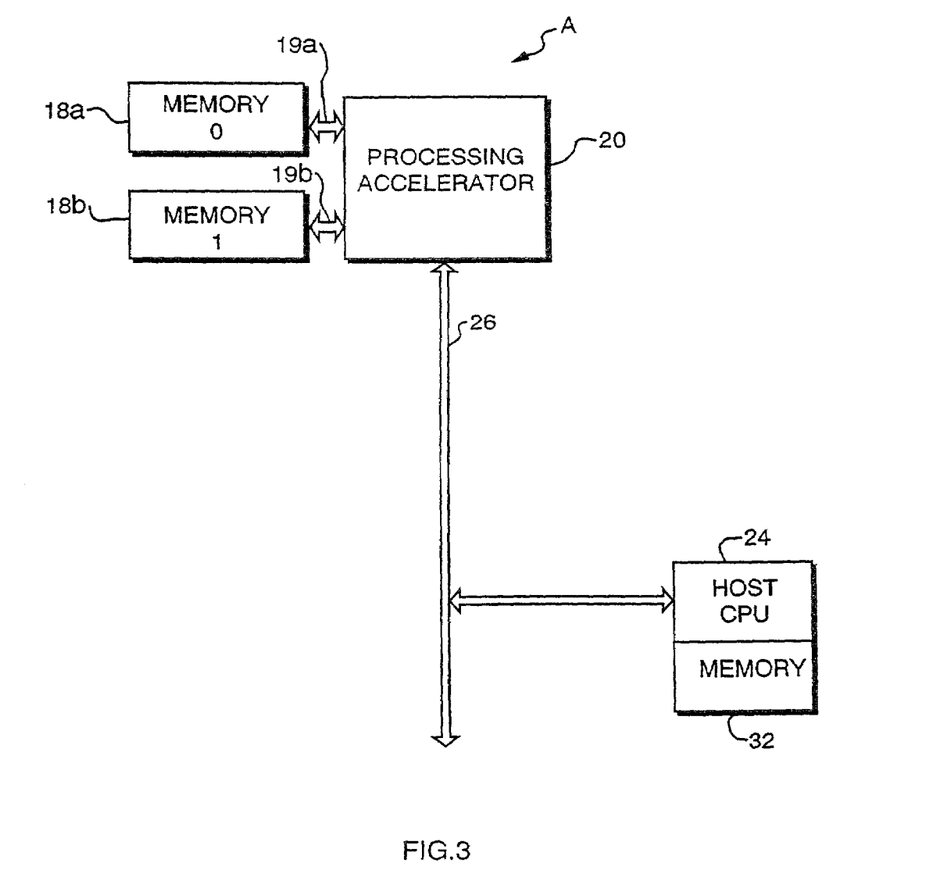
FIG. 3 is a block diagram of a processing accelerator configured without a digitizer, according to another embodiment of the invention.

FIG. 3 shows a further cost-reduced variation of the above-mentioned processing accelerator configuration. This configuration incorporates only the processing accelerator subsystem A without a digitizer subsystem. Here, images are acquired through a separate frame grabber board (not shown). As in the configuration of FIG. 2, the host PC CPU 24 runs the vision application. However, the vision processing accelerator ASIC 20 is still available to accelerate vision computations.

Figure 4:
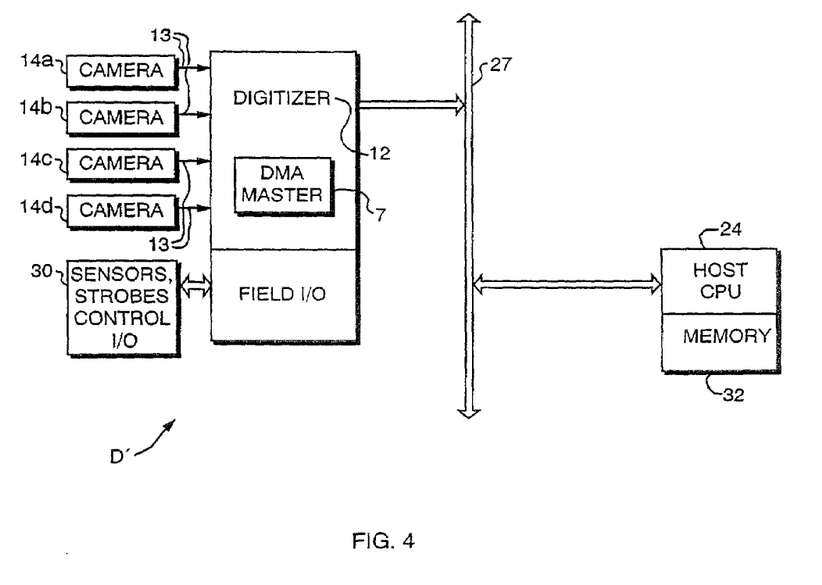
FIG. 4 is a block diagram of a frame grabber configuration according to yet another embodiment of the invention.

As FIG. 4 further shows, a frame grabber (digitizer) D', which can be built from the mezzanine card components by changing the PCI mezzanine connector (36 of FIG. 1) to a standard PCI edge connector (not shown), may interface directly to the host CPU PCI peripheral bus 27. This further allows for the development of software drivers from existing software components.

Figure 5:
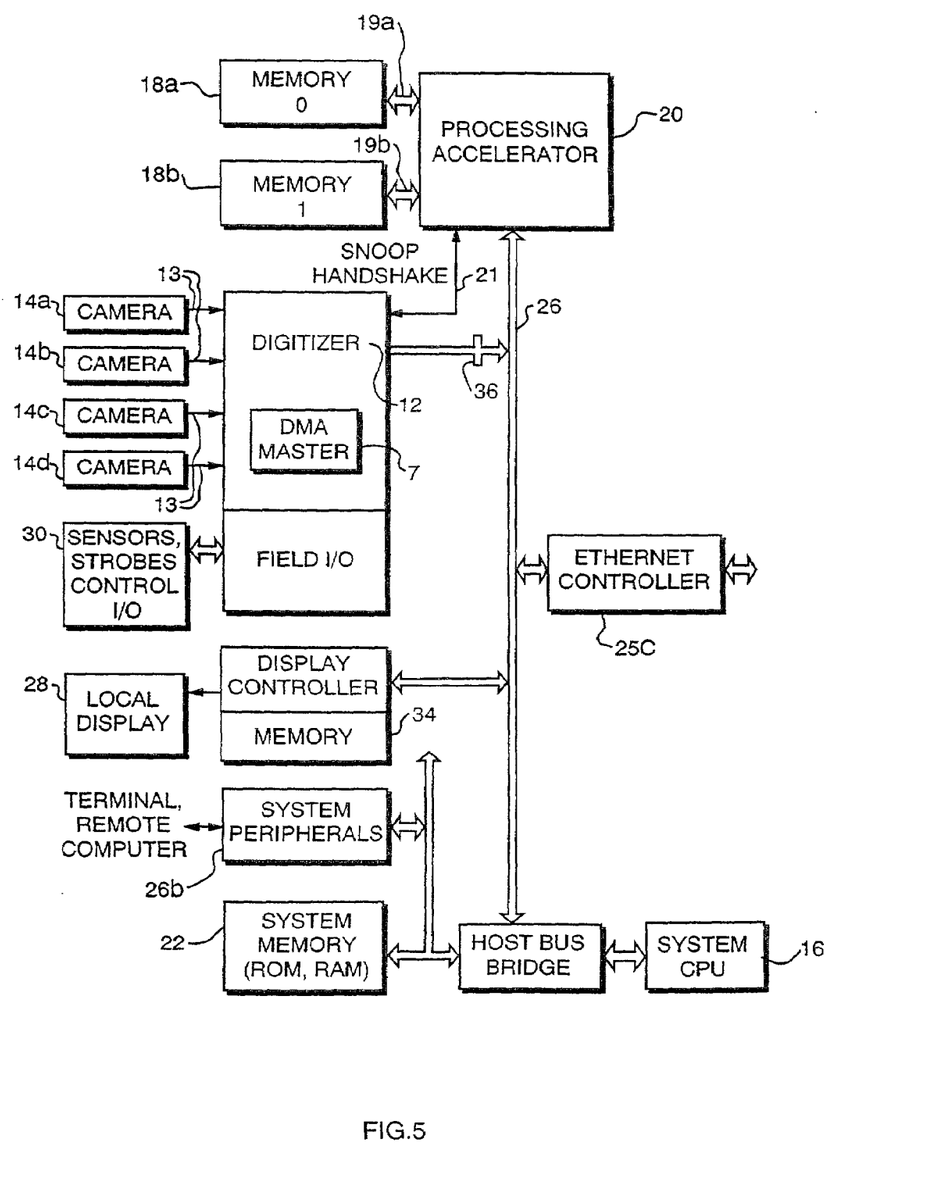
FIG. 5 is a block diagram of a standalone vision processing engine architecture according to one embodiment of the present invention.
Figure 6A:
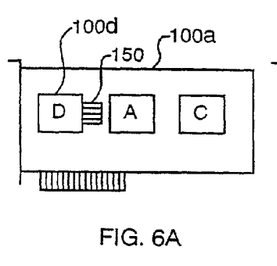
FIG. 6 is a schematic diagram showing a summary of some of the various different architectural configurations from the previous Figures.
Figure 6B:
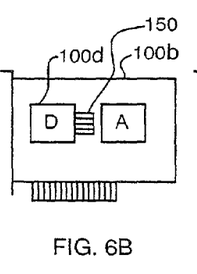
Figure 6C:
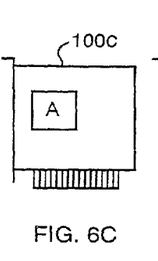
Figure 6D:
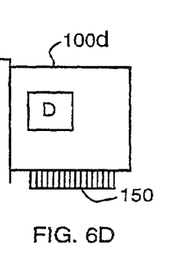
Figure 6E:
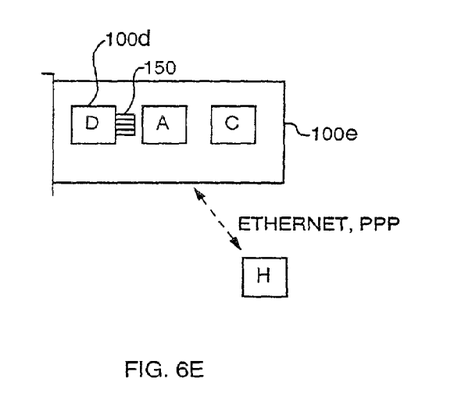

Turning now to FIG. 5, a fifth embodiment of the invention is shown. In this embodiment, an Ethernet controller 25c or any other communications means such as PPP (TCPIP protocol over a serial line), can be attached to the vision system peripheral bus 26 in place of the PCI-to-PCI bus bridge 25 of FIG. 1, so that the vision processor acts as a standalone vision processor. As can be seen in FIG. 5, the standalone vision processor configuration includes most of the same components described above with respect to the vision system of FIG. 1.

Other configurations can be envisioned with different functional groupings of the basic subsystems highlighted in FIG. 1, including for example, but not limited to, incorporating a camera in the same package as the vision processing engine to form a "smart camera" configuration.

A summary of the preceding Figures is shown in FIGS. 6a–6e, wherein block 'C' represents the Embedded CPU Subsystem including the CPU, host bus bridge, system memory, peripherals, Ethernet controller and display controller; block 'D' represents the Digitizer and Field I/O mezzanine card (100d having a PCI or other system bus compatible edge connector 150 such as a PCI mezzanine connector); and block 'A' represents the processing accelerator and its captive memories. "H" represents a host computer, which is accessed via an Ethernet or PPP connection.

The key challenges in making this architecture work are highlighted in the following sections.

Hiding PCI Devices

Up to 21 PCI devices may be addressed on a PCI bus. When devices lie behind a peripheral bridge on its secondary bus, the bridge architecture specification will allow up to 16 devices to be addressed. Secondary bus addressing is implemented by connecting the device IDSEL line to a PCI address line in the range AD[31:16]. When a configuration cycle is issued for a device on the same bus as the target, up to 21 devices may be addressed on AD[31:11], the remaining lines being used to identify configuration cycle type, configuration register number and device function number. This means that a device on the secondary bus (side) of the peripheral bus bridge 25 and connected to AD[15:11] is hidden from the primary side of the peripheral bus bridge 25, but not from the embedded CPU on the secondary PCI bus.

The display controller that is used as a local (secondary) display device confuses both the PCI BIOS (Basic Input Output System) and the installed host PC's display controller drivers as to which display device should be used as the system display device. Hiding this local display device behind the PCI bridge (by connecting its IDSEL line to a PCI address line in the range AD[15:11]) means that the display device is only addressable for PCI configuration cycles by the embedded CPU.

Although this method provides a way to initialize a private device behind a peripheral bridge, the device is always visible in the final system memory map if the peripheral bridge's memory window encompasses the device's assigned memory region.

Another method to hide PCI devices addresses power-on issues (e.g. when the PCI BIOS tries to interrogate the host bus bridge before its initialization sequence is complete it could cause the host PC to "hang" during boot).

When a PCI device has multiple clock domains the other clock(s) may be supplied from a source that has a long startup latency for a variety of reasons. The device may also require all clocks to be operational before it can reset its internal state machines. If this delay time is greater than the time that the PC needs before it starts executing its BIOS code, there is the potential for deadlock. Here, a state machine (its operation shown in FIG. 7) is used to control the reset release and the PCI device's IDSEL connection sequencing, to ensure correct operation—effectively disconnecting the device from the PCI bus until it is ready to accept bus transactions.

Figure 7:
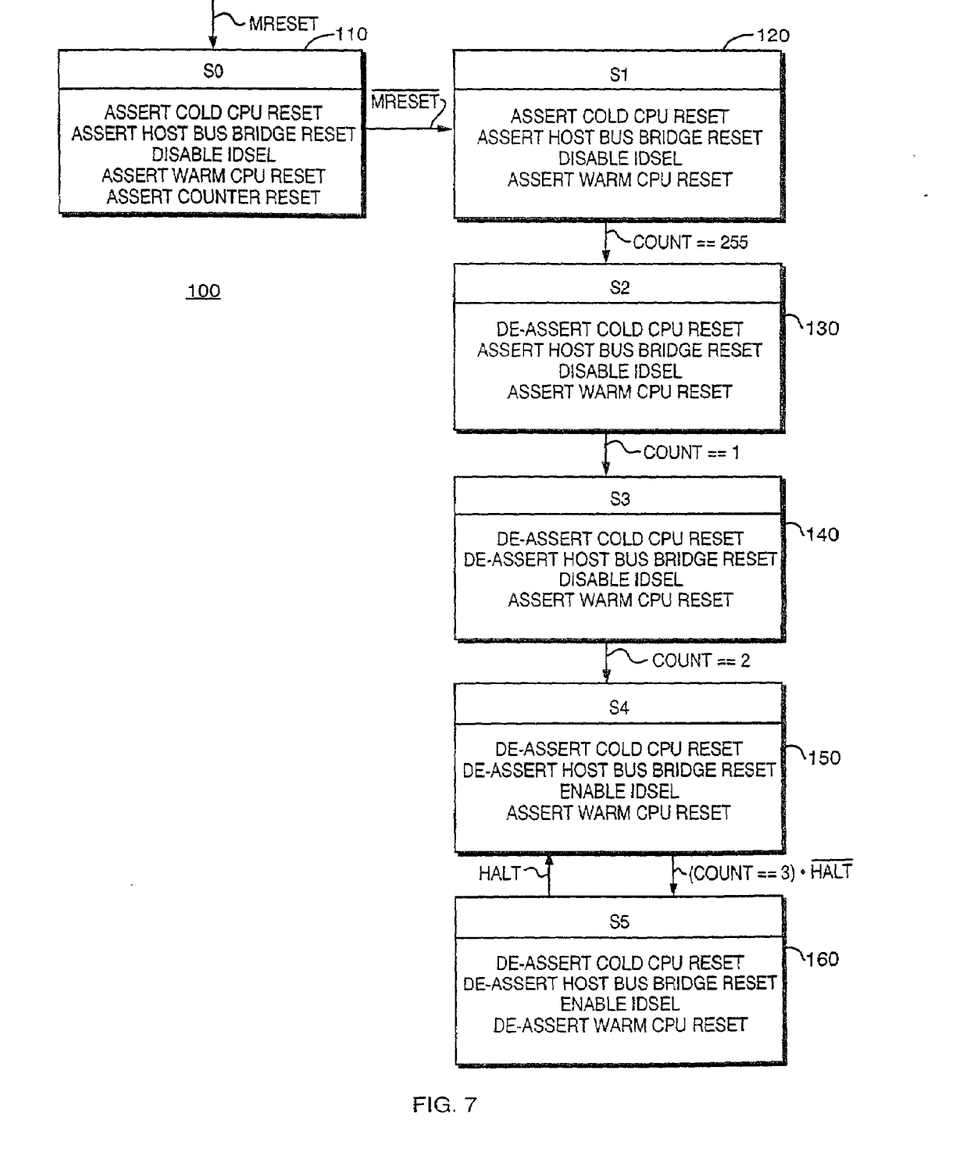
FIG. 7 is a flow chart showing the steps to accomplish the boot time reset.

In state S0, step 110, the state machine 100 asserts cold CPU reset, asserts host bus bridge reset, disables IDSEL to the host bus bridge, asserts warm CPU reset and resets an 8-bit counter to a count value of 0 (counter reset). In state S1, step 120, which is reached when power reaches a sufficient level or manual reset is released, the state machine continues to assert cold CPU reset and host bus bridge reset. It releases the counter reset to allow the counter to increment, and continues to disable IDSEL and assert warm CPU reset. Progression to state S2, step 130 will happen when the counter value reaches 255 (256 clock cycles after S1), and the state machine de-asserts cold CPU reset. However, host bus bridge reset remains asserted as does warm CPU reset. In addition, IDSEL remains disabled. Thus, the host CPU can load its mode information and start its system clocks.

In state S3, step 140, the state machine continues to de-assert cold CPU reset. It also de-asserts host bus bridge reset, thus allowing the bridge to complete its internal initialization. IDSEL remains disabled and warm CPU reset remains asserted. Moving on to state S4, step 150, IDSEL is enabled, thus allowing host bus bridge to become visible on the secondary system (vision system in this implementation) and visible to the host PC. (Cold CPU reset and host bus bridge reset remain de-asserted and warm CPU reset remains asserted.)

Progression from state S4 to state S5 will generally not occur immediately, the average wait time being 128 clock cycles. The 8 bit counter is enabled in all states except state S0, and will continually count with a modulo of 256. There is a minimum wait of one cycle possible which is enough to perform a soft reset on the CPU.

Finally, in state S5, step 160, warm CPU reset is deasserted under software control by deasserting a "halt" register bit with the CPU. Thus, the embedded (vision) system CPU is allowed to boot. This state progression thus allows two CPU's and multiple, potentially conflicting peripheral components to be sequentially initialized without causing system hang-ups.

In summary, the Boot Time State Machine 100 performs three functions:
1. It waits for all the clocks that are needed by the device to be active;
2. It asserts device reset until after the clocks are present; and
3. It holds IDSEL disabled until a programmable number of PCI clock cycles after reset is deasserted.

The first feature above solves the problem that the embedded CPU must provide a synchronous clock to the host bus bridge which operates at a different frequency from the oscillator that supplies the embedded CPU. Therefore, the CPU frequency generator must supply the host bus bridge clock. This supplied clock is started only after the embedded CPU has loaded it's mode information from the complex programmable logic device CPLD. Reset must be deasserted only after the clock from the CPU is present so that the host bus bridge can correctly initialize its internal state. PCI accesses should not be responded to until enough PCI clock cycles have passed from reset deassertion to ensure that the reset completes correctly.

This solution is also equally applicable to a PCI device on the primary or secondary side of a peripheral bridge and anywhere in the PCI bus hierarchy.

Although this method provides a way to initialize a private device behind a peripheral bridge, the device is always visible in the final system memory map if the peripheral bridge memory window encompasses the device's assigned memory region.

Embedded CPU Reset

When the host bus bridge device locks up the secondary PCI bus, the embedded CPU and its devices are inaccessible from the primary PCI bus, including any device registers that can assert a soft reset to the CPU.

A back-door signal (26d of FIG. 1) was created from the peripheral bridge to a system peripheral that ensures resets can be asserted to recover the system. While this is useful primarily for debugging, its use in the driver ensures that no problems occur during driver loading. The signal is attached to the peripheral bridge's general purpose input/output (GPIO) port which is addressable from configuration space on the primary bus.

Loading OS and Test Code

An embedded CPU is usually tested and booted by running code that is present in an on-board ROM or FLASH memory because there is no other way to load this code into the embedded CPU's memory.

With this architecture, code can be loaded over the PCI bus from any source, including an Ethernet device or a host PC. This allows the ROM or FLASH memory to be removed from the board which reduces cost and allows easy field updates by disk or Internet/Intranet.

An additional feature of the present invention facilitates and allows for the use of a non-standard or non-recognized PCI bus connected device such as, for example, a vision system board, embedded CPU or other similar device. When the main system BIOS (the PC (personal computer) boots, the BIOS scans the bus for devices connected to the bus, and allocates system memory for each device. If the BIOS sees a device that it does not recognize, the BIOS ignores the device and does not allocate memory for that particular device.

Accordingly, the present invention features a system and method for reserving memory in such a situation; such a system and method being completely independent of the type of BIOS and the type of device plugged into the PCI or other bus. The system and method involves making the otherwise foreign device look like a very standard device so that the BIOS will then reserve memory for the device.

Figure 8:
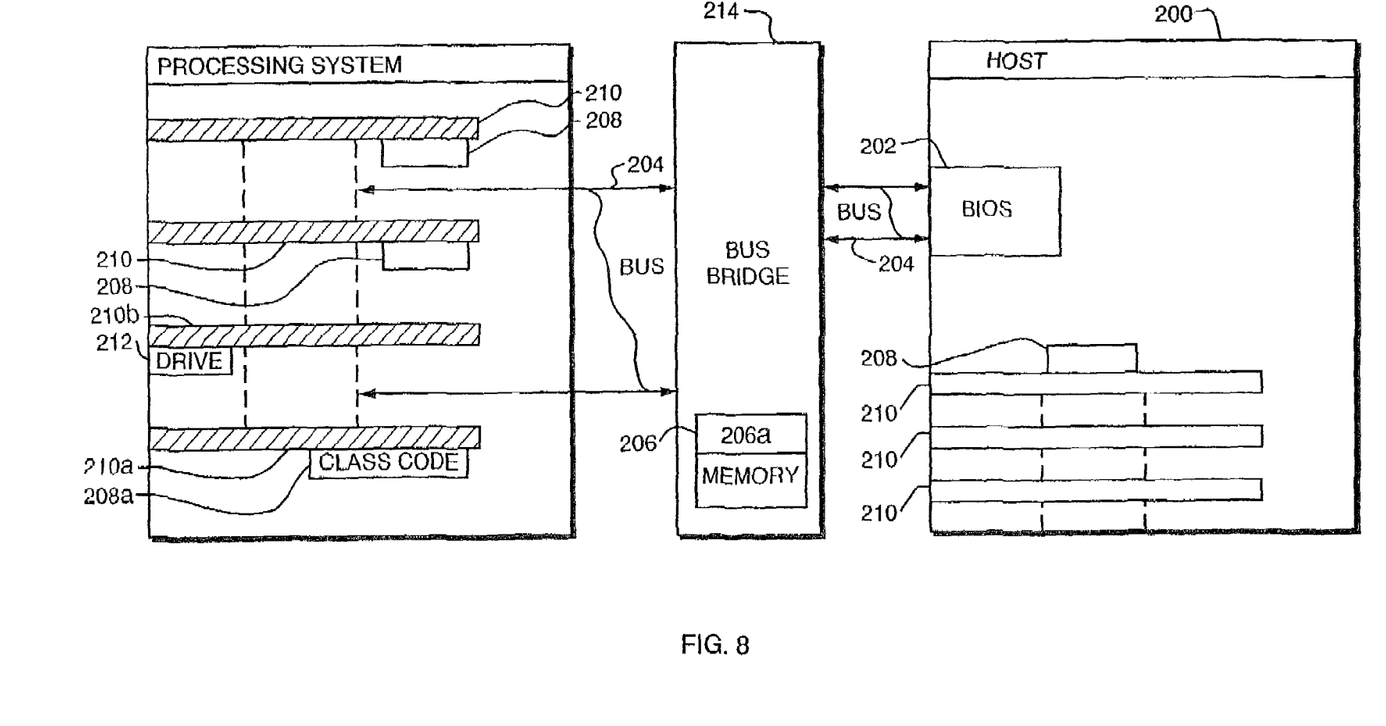
FIG. 8 is a schematic diagram of a system for implementing the bus memory reservation according to another feature of the present invention.

For example, in the case of a host or main processing system 200, FIG. 8, such as a PC, the host system BIOS is called upon startup of the host or main system 200. The BIOS 202 reserves and allocates system memory resources 206 for each device it sees on the bus 204 (for example, the PCI bus in the preferred embodiment). The BIOS 202 allocates system memory resources 206 by addressing each device 210 on the bus 204 and reading the contents of the class code register 208 of each of the devices 210 (boards, etc.) on the bus 204. In the preferred embodiment described herein, the memory 206 is located on a peripheral bus bridge 214 (25 in FIG. 1). Each device's class code register 208 includes a class code and sub-code that is predefined in the BIOS specification, and which tells the BIOS exactly what type of device is connected to the bus and how much and/or what type of memory to allocate for that device.

Accordingly, the system and method of the present invention includes placing a "dummy" device 210 on the bus 204. The dummy device 210a will include a well known and standard class code/sub-class code in its class code register 208a. The non-standard device 210b, such as a device with an embedded processor, etc., will not have a class code register 208. An example of a well known device is an Ethernet card which every BIOS 202 will recognize.

The BIOS 202 will then allocate a specified amount of memory 206a to the particular device of interest 210b (such as a non-standard device) based on the class code of the dummy board 210a. Subsequently, the driver 212 for the particular device 210b of interest will determine the address range of the memory space 206a allocated to the dummy device 210a, and will divide and allocate that memory range to various elements (embedded processors, registers, FIFO's, etc.) on the device 210b which will need to utilize the allocated memory space 206a.

In this manner, the above described feature of the present invention provides for memory reservation by utilizing a dummy or surrogate device to reserve memory for a non-standard device, thus forcing the system BIOS to allocate memory to a desired device based on the class code of a dummy or surrogate device.

Modifications and substitutions by one of ordinary skill in the art are considered to be within the scope of the present invention which is not to be limited except by the claims which follow.

What is claimed is:

1. A configurable vision processing system for connection to a personal computer (PC), said configurable vision processing system comprising:
a local peripheral component interconnect (PCI) bus;
a vision accelerator subsystem coupled to said local (PCI) bus, said vision accelerator subsystem including a processing accelerator and at least one image memory interfaced with said processing accelerator;
a digitizer subsystem directly coupled to said local (PCI) bus, said digitizer subsystem including a digitizer and at least one camera coupled to said digitizer; and
a vision central processing unit (CPU) subsystem coupled to said local (PCI) bus, said vision CPU subsystem including an embedded vision system CPU, a host bus bridge for interfacing said vision system CPU to said local (PCI) bus, system memory, at least one system peripheral, and a display controller for interfacing a local display to said local (PCI) bus.

2. The configurable vision processing system of claim 1 further including a peripheral bus bridge coupled to said local PCI bus, wherein said peripheral bus bridge is adapted to be coupled to a host PCI bus within said PC such that said configurable vision processing system is implemented as a PCI add-in extension board.

3. The configurable vision processing system of claim 2 wherein said display controller has an identification selection (IDSEL) line connected to a PCI address line of said local PCI bus in a range of AD[15:11] and wherein said host bus bridge has an IDSEL line connected to a PCI address line of said host PCI bus in a range of AD[31:16].

4. The configurable vision processing system of claim 2 further including a back-door signal between said peripheral bus bridge and said vision CPU subsystem, for resetting said vision CPU subsystem if said vision CPU subsystem locks up.

5. The configurable vision processing system of claim 3 wherein said vision CPU subsystem includes means for controlling a reset release and an identification selection (IDSEL) connection sequencing of devices connected to said local PCI bus to temporarily disable said devices from said local PCI bus.

6. A configurable vision processing system for connection to a personal computer (PC), said configurable vision processing system comprising:
a local peripheral component interconnect (PCI) bus;
a vision accelerator subsystem directly coupled to said local (PCI) bus, said vision accelerator subsystem including a processing accelerator and at least one image memory interfaced with said processing accelerator;
a digitizer subsystem directly coupled to said local (PCI) bus, said digitizer subsystem including a digitizer and at least one camera coupled to said digitizer; and
a vision central processing unit (CPU) subsystem coupled to said local (PCI) bus, said vision CPU subsystem including an embedded vision system CPU, a host bus bridge for interfacing said vision system CPU to said local (PCI) bus, system memory, at least one system peripheral, and a display controller for interfacing a local display to said local (PCI) bus.

* * * * *